(12) United States Patent
Kobayashi (10) Patent No.: US 10,623,301 B2
(45) Date of Patent: Apr. 14, 2020

(54) METHOD, ROUTING BRIDGE AND NON-TRANSITORY COMPUTER-READABLE STORAGE MEDIUM FOR NETWORK ROUTING

(71) Applicant: FUJITSU LIMITED, Kawasaki-shi, Kanagawa (JP)

(72) Inventor: Ryu Kobayashi, Kanazawa (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/108,378

(22) Filed: Aug. 22, 2018

(65) Prior Publication Data

US 2019/0068481 A1    Feb. 28, 2019

(30) Foreign Application Priority Data

Aug. 24, 2017    (JP) .................................. 2017-161493

(51) Int. Cl.
| | |
|---|---|
| H04L 12/50 | (2006.01) |
| H04L 12/715 | (2013.01) |
| H04L 29/06 | (2006.01) |
| H04L 12/741 | (2013.01) |
| H04L 12/46 | (2006.01) |
| H04L 12/721 | (2013.01) |
| H04L 29/08 | (2006.01) |

(52) U.S. Cl.
CPC .............. *H04L 45/04* (2013.01); *H04L 12/46* (2013.01); *H04L 45/66* (2013.01); *H04L 45/74* (2013.01); *H04L 69/22* (2013.01); *H04L 69/324* (2013.01)

(58) Field of Classification Search
CPC ......... H04L 49/15; H04L 49/35; H04L 49/60; H04L 49/604

USPC ................................. 370/386, 400, 465, 466
See application file for complete search history.

(56) References Cited

U.S. PATENT DOCUMENTS

| | | | | |
|---|---|---|---|---|
| 8,345,697 B2* | 1/2013 | Kotha | ..................... | H04L 45/66 |
| | | | | 370/401 |
| 9,544,219 B2* | 1/2017 | Chong | ..................... | H04L 45/02 |
| 9,614,758 B2* | 4/2017 | Oonuki | ..................... | H04L 45/64 |
| 9,912,614 B2* | 3/2018 | Koganti | ................. | H04L 49/25 |
| 10,097,372 B2* | 10/2018 | Bhattacharya | ........ | H04L 45/745 |

(Continued)

FOREIGN PATENT DOCUMENTS

JP          5950019          7/2016

OTHER PUBLICATIONS

Perlman, RFC 6325 Routing Bridges, RFC, Jul. 2011, 87 pages.*

*Primary Examiner* — Dmitry Levitan
(74) *Attorney, Agent, or Firm* — Fujitsu Patent Center (57) ABSTRACT

A method executed in a plurality of domains, each of the plurality of domains including a plurality of switch apparatuses, the method includes receiving, by a first switch apparatus included in a first domain of the plurality of domains, a packet from a second domain, adding, to the packet, a header region in which a hop number of the packet is to be registered, transmitting the packet with the header region from the first switch apparatus to a second switch apparatus of the plurality of switch apparatuses included in the first domain, increasing the hop number registered in the header region in response to the transmitting of the packet from the first switch apparatus to the second switch apparatus, and when the packet is transmitted from the first domain to a third domain of the plurality of domains, resetting the hop number registered in the header region.

15 Claims, 11 Drawing Sheets

(56) References Cited

U.S. PATENT DOCUMENTS

| | | | |
|---|---|---|---|
| 10,205,613 B2 * | 2/2019 | Kobayashi | H04L 25/20 |
| 2010/0226381 A1 * | 9/2010 | Mehta | H04L 12/465 |
| | | | 370/401 |
| 2011/0299533 A1 * | 12/2011 | Yu | H04L 12/4604 |
| | | | 370/392 |
| 2014/0211794 A1 * | 7/2014 | Frost | H04L 45/20 |
| | | | 370/389 |
| 2016/0006652 A1 | 1/2016 | Oonuki | |
| 2019/0068481 A1 * | 2/2019 | Kobayashi | H04L 45/04 |

* cited by examiner

METHOD, ROUTING BRIDGE AND NON-TRANSITORY COMPUTER-READABLE STORAGE MEDIUM FOR NETWORK ROUTING

CROSS-REFERENCE TO RELATED APPLICATION

This application is based upon and claims the benefit of priority of the prior Japanese Patent Application No. 2017-161493, filed on Aug. 24, 2017, the entire contents of which are incorporated herein by reference.

FIELD

The embodiment discussed herein relates to a method, a switch apparatus and a non-transitory computer-readable storage medium.

BACKGROUND

As a protocol that makes a route in Layer 2 of an open systems interconnection (OSI) reference model redundant, there is transparent interconnection of lots of links (TRILL). TRILL has features of effective utilization of a frequency bandwidth, high speed switching upon failure and so forth in comparison with spanning tree protocol (STP).

It is to be noted that there is a technology which provides a routing controlling unit in an environment in which a network that transfers a packet along a route indicated from an upper apparatus and another network that performs routing control of the autonomous control type are coupled to each other. In the technology, a communication system includes a first switch that performs information exchange with adjacent switches by a given routing protocol to generate a transfer table and refers to the transfer table to transfer a packet. The communication system further includes a second switch that transfers a packet in accordance with an instruction from a given controller, a controller that issues an instruction to the second switch, and an integrated controller.

The integrated controller issues, to the controller, a packet transfer instruction along a designated route to the second switch and an instruction to generate a virtual network configured from switches that virtualize the first switch to the controller. Then, the integrated controller causes the controller to perform information exchange by a given routing protocol between the second switch and the first switch mapped to the virtual network such that packet transfer is performed along a route calculated in advance. As a related art, for example, there is Japanese Patent No. 5950019.

SUMMARY

According to an aspect of the embodiment, a method executed in a network including a plurality of domains coupled to each other, each of the plurality of domains including a plurality of switch apparatuses coupled to each other, the method includes receiving, by a first switch apparatus of the plurality of switch apparatus included in a first domain of the plurality of domains, a packet from a second domain of the plurality of domains, adding, to the packet by the first switch apparatus, a header region in which a hop number of the packet is to be registered, transmitting the packet with the header region from the first switch apparatus to a second switch apparatus of the plurality of switch apparatuses included in the first domain, increasing the hop number registered in the header region in response to the transmitting of the packet from the first switch apparatus to the second switch apparatus, and when the packet is transmitted from the first domain to a third domain of the plurality of domains, resetting the hop number registered in the header region.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 11:
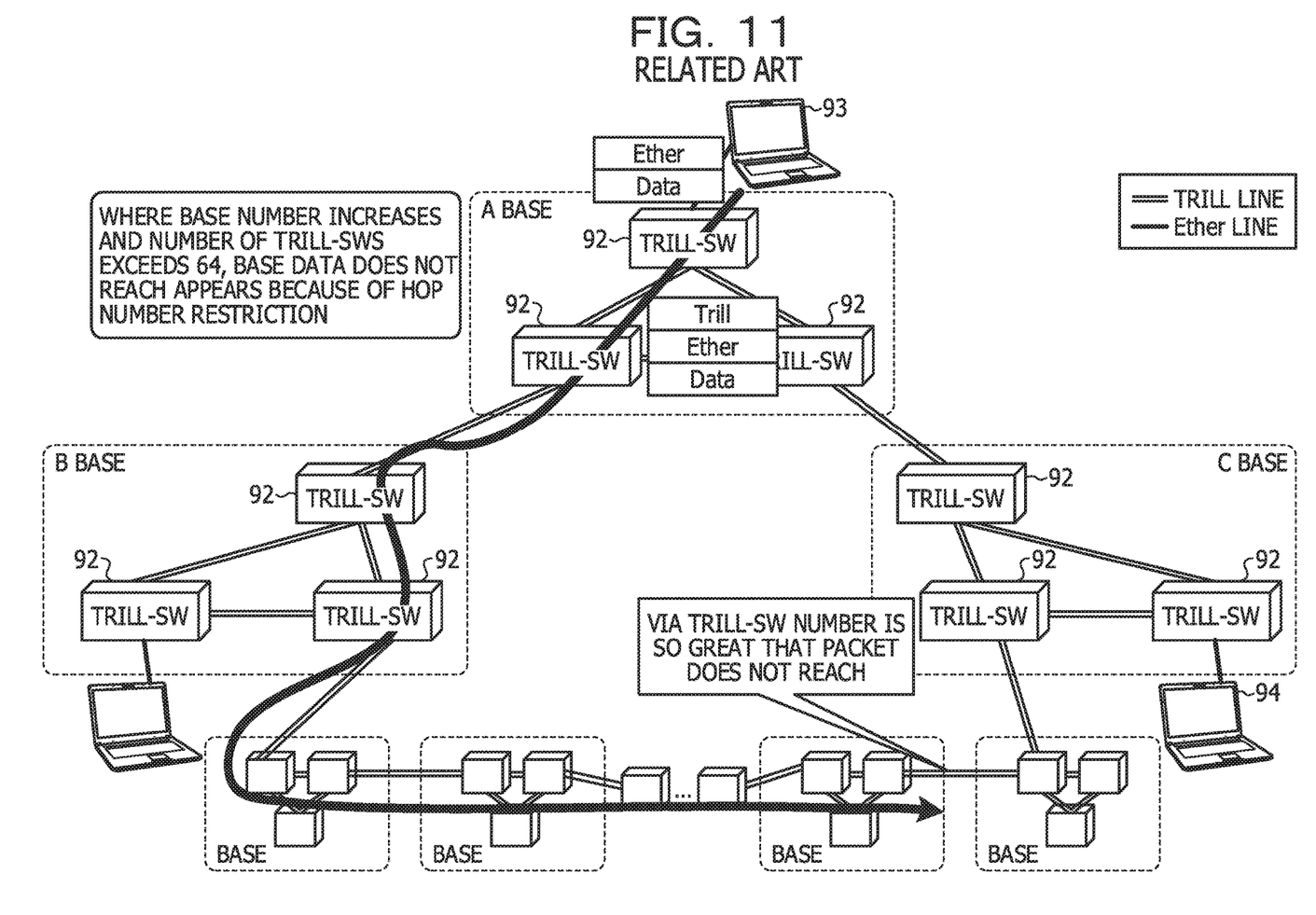
FIG. 11 is a view illustrating restriction to the number of hops.

Although TRILL has the features of effective utilization of a frequency bandwidth, high speed switching upon failure and so forth in comparison with STP, TRILL has a problem that packet transfer is difficult through more than 64 TRILL-SWs because of restriction to the number of hops. FIG. 11 is a view illustrating restriction to the number of hops. Referring to FIG. 11, each of TRILL-SWs 92 is a switch that performs communication by TRILL. Data indicates data that is transmitted and received. Ether indicates an Ethernet (registered trademark; this similarly applies in the following description) header. Trill indicates a TRILL header.

An apparatus that performs communication through a TRILL network is coupled to a TRILL-SW 92 by an Ether line (Ethernet line). The TRILL-SWs 92 are coupled to each other by a TRILL line. As depicted in FIG. 11, a packet is transmitted from a transmission apparatus 93 to a reception apparatus 94 through a plurality of TRILL-SWs 92. However, the number of via TRILL-SWs 92 that are passed by the packet is not allowed to exceed 64.

Further, in the TRILL network, a multicast packet is transferred to unnecessary ports. Furthermore, since each TRILL-SW 92 accumulates routing information of all TRILL-SWs 92, as the number of TRILL-SWs 92 increases, routing information increases and the routing calculation amount increases, by which the network becomes less stabilized.

Figure 1:
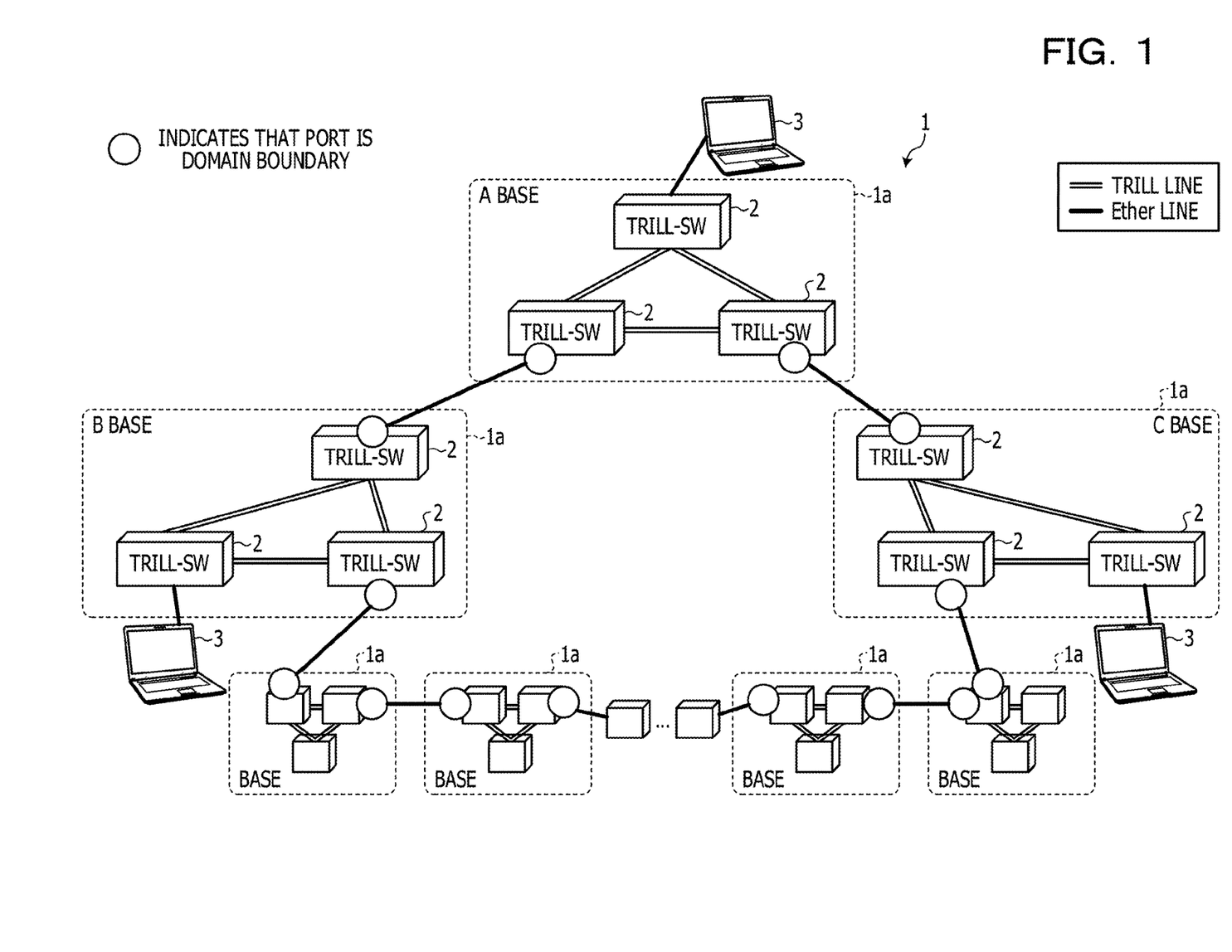
FIG. 1 is a view illustrating domain division according to an embodiment.

First, domain division according to an embodiment is described. FIG. 1 is a view illustrating domain division according to the embodiment. In FIG. 1, a TRILL network 1 is divided into a plurality of bases and divided into a plurality of domains 1a in a unit of a base. A TRILL-SW 2 is a switch that performs communication by TRILL.

In each domain 1a, TRILL-SWs 2 are coupled to each other by a TRILL line. Between the domains 1a, the TRILL-SWs 2 are coupled to each other by an Ether line. A terminal 3 and a TRILL-SW 2 are coupled to each other by an Ether line. In place of the terminal 3, an information processing apparatus may be coupled to a TRILL-SW 2 by an Ether line. A round mark applied to the TRILL-SWs 2 indicates a port of a domain boundary. It is to be noted that, although, in FIG. 1, the TRILL network 1 is divided in a unit of a base, the TRILL network 1 may otherwise be divided in some other unit.

Figure 2:
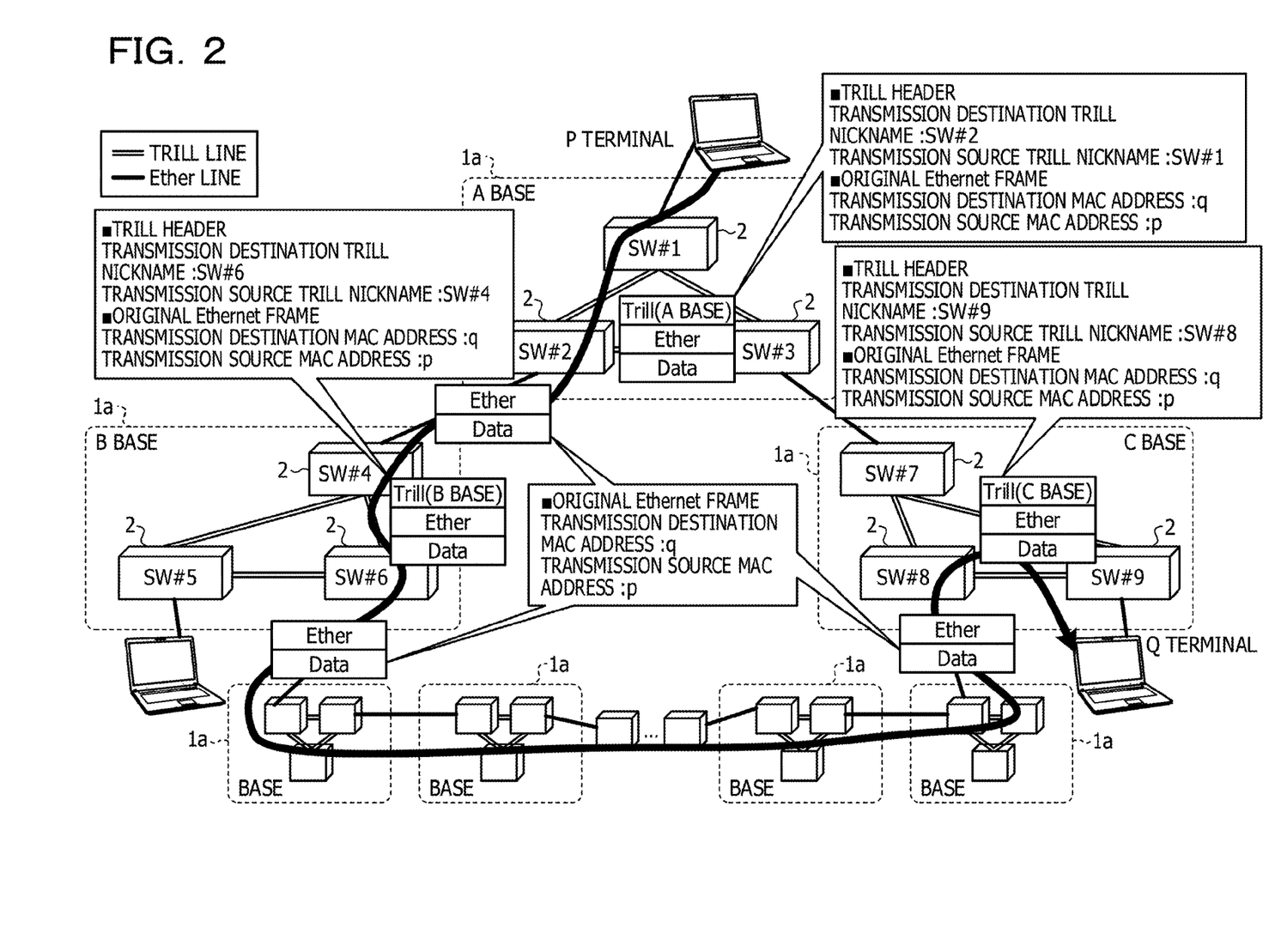
FIG. 2 is a view illustrating a packet transmission operation.

FIG. 2 is a view illustrating a packet transmission operation. In FIG. 2, a packet is transmitted from a P terminal coupled to a TRILL-SW 2 in the A base to a Q terminal coupled to a TRILL-SW 2 in the C base.

As depicted in FIG. 2, in the A base, TRILL-SWs 2 represented by SW#1, SW#2 and SW#3 are included, and SW#1, SW#2 and SW#3 configure one domain 1a. Similarly, in the B base, TRILL-SWs 2 represented by SW#4, SW#5 and SW#6 are included, and SW#4, SW#5 and SW6 configure one domain 1a. Similarly, in the C base, TRILL-SWs 2 represented by SW#7, SW#8 and SW#9 are included, and SW#7, SW#8 and SW#9 configure one domain 1a.

A packet that is transferred within a domain 1a includes a TRILL header. Meanwhile, a packet that is transferred between domains 1a does not include a TRILL header. For example, in the A base, a packet transmitted from SW#1 to SW#2 includes a TRILL header for the A base. Trill (A base) indicates the TRILL header for the A base. The TRILL header includes SW#2 as a transmission destination TRILL nickname and includes SW#1 as a transmission source TRILL nickname.

Meanwhile, a packet transmitted from SW#2 to SW#4 includes only Ether and Data without a TRILL header. Ether includes p as a transmission source media address control (MAC) address and includes q as a transmission destination MAC address. Here, p is a MAC address of the P terminal, and q is a MAC address of the Q terminal.

For example, if a TRILL-SW 2 receives a packet from a different domain, the TRILL-SW 2 adds a TRILL header to the packet, and in the case where the TRILL-SW 2 transmits a packet to the different domain, the TRILL-SW 2 removes the TRILL header. The hop number included in the TRILL header is initialized at a point of time at which the TRILL header is added. Accordingly, in the TRILL network 1, the restriction to the hop number may be eliminated by increasing the number of domain division as occasion demands.

Figure 3:
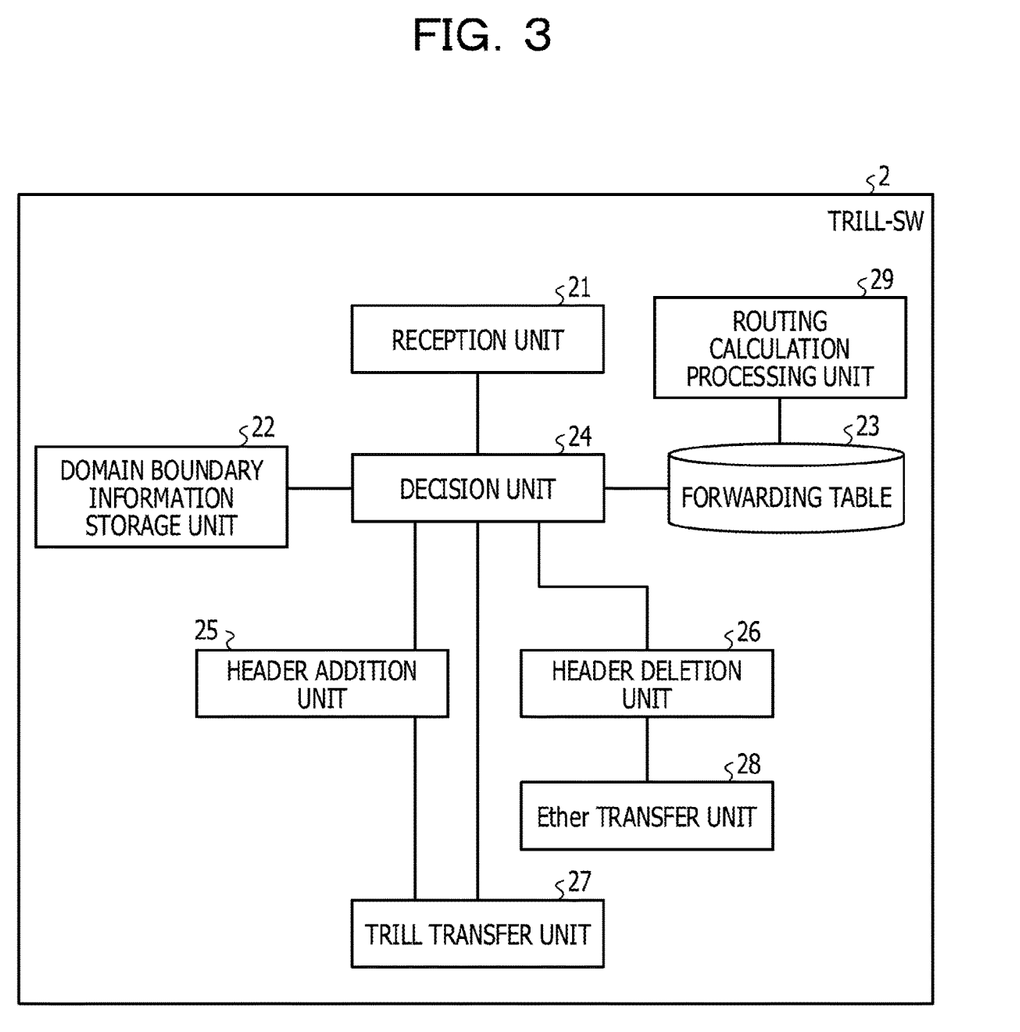
FIG. 3 is a block diagram depicting a functional configuration of a TRILL-SW.

Now, a functional configuration of a TRILL-SW 2 is described. FIG. 3 is a view depicting a functional configuration of a TRILL-SW 2. As depicted in FIG. 3, the TRILL-SW 2 includes a reception unit 21, a domain boundary information storage unit 22, a forwarding table 23, a decision unit 24, a header addition unit 25 and a header deletion unit 26. The TRILL-SW 2 further includes a TRILL transfer unit 27, an Ether transfer unit 28 and a routing calculation processing unit 29.

Figure 4:
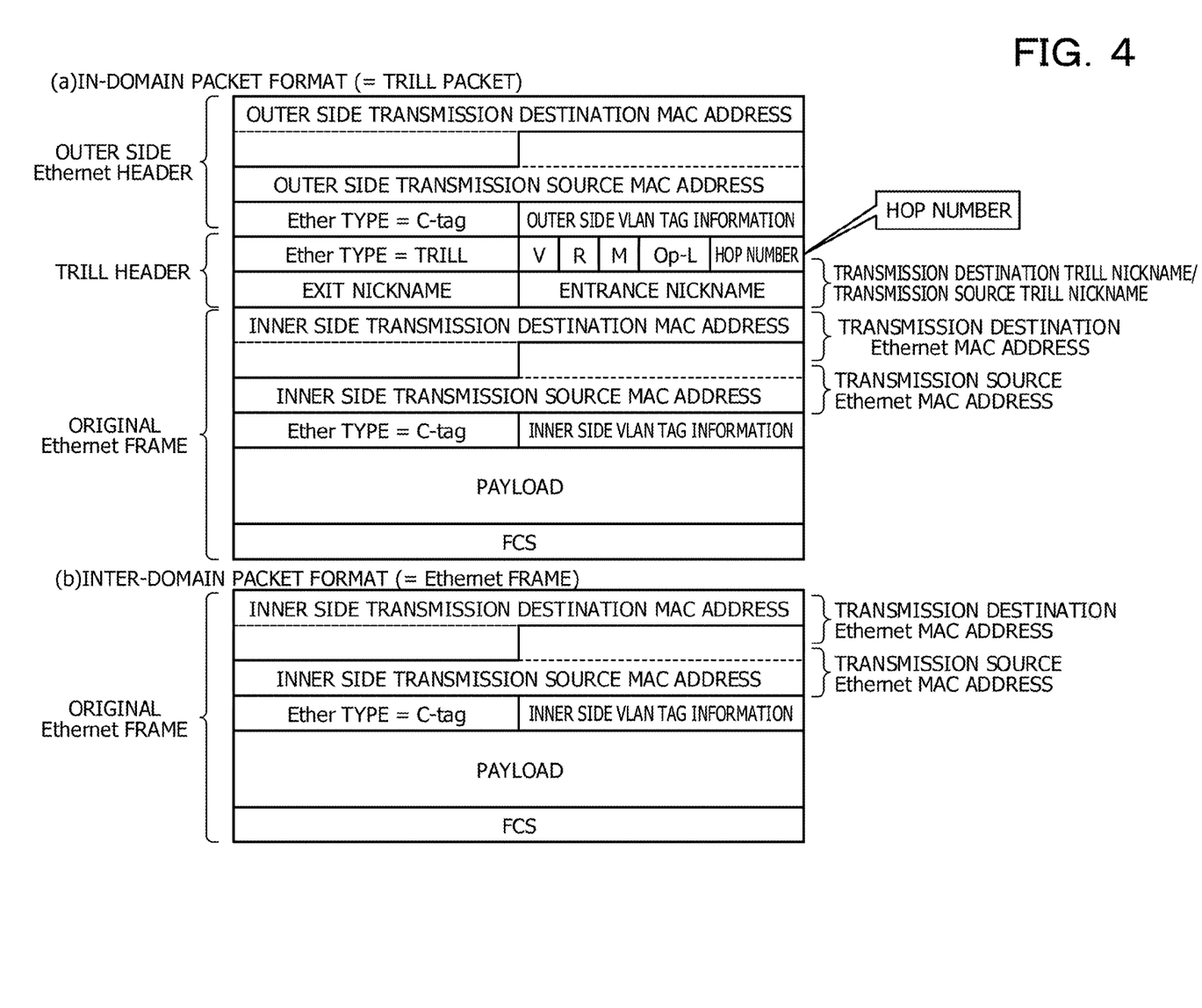
FIG. 4 is view depicting packet formats.

The reception unit 21 receives a packet from the terminal 3 or a different TRILL-SW 2 and passes the packet to the decision unit 24. FIG. 4 is view depicting packet formats. FIG. 4 depicts a packet format in a domain 1a, and FIG. 4 depicts a packet format between domains 1a. As depicted in FIG. 4, in the domain 1a, a TRILL header and an outer side Ethernet header (Outer Ether Header) are added to an original Ethernet frame.

The original Ethernet frame includes an inner side transmission destination MAC address (Inner Destination MAC Address), an inner side transmission source MAC address (Inner Source MAC Address), and an Ether type (Ether Type). The Ethernet frame further includes inner side VLAN tag information (Inner Virtual Local Area Network tag info), a payload (Payload) and a frame check sequence (FCS).

The inner side transmission destination MAC address is a MAC address of a transmission destination. The inner side transmission source MAC address is a MAC address of a transmission source. In the Ether type, C-tag is designated. C-tag indicates that the header to be added is a TRILL header. The inner side VLAN tag information is tag information of a VLAN. The payload is data to be transmitted. The FCS is a bit string to be used for detection and correction of a data error.

The TRILL header includes Ether type, V (Version), R (Reserved), M (Multi-Destination), Op-L (Option Length), hop number (Hop Count), exit nickname (Egress Nickname) and entrance nickname (Ingress Nickname).

In Ether type, TRILL is designated. V indicates a version. R is for future expansion. M indicates whether or not a plurality of destinations are involved. Op-L indicates a length of an option field. The option field is positioned next to the entrance nickname. Hop number indicates a number of TRILL-SWs 2 through which a packet passes in the domain 1a. The bit length of hop number is 6.

Exit nickname is a name of a TRILL-SW 2 at the exit of the domain 1a. Entrance nickname is a name of a TRILL-SW 2 at the entrance of the domain 1a. Entrance nickname and exit nickname are not conveyed to the outside of the domain 1a. Accordingly, the routing information distribution range is restricted, and enlargement of routing information may be suppressed.

The outer side Ethernet header includes outer side transmission destination MAC address (Outer Destination MAC Address), outer side transmission source MAC address (Outer Source MAC Address), Ether type and inner side VLAN tag information (Inner VLAN tag info).

Outer side transmission destination MAC address is a MAC address of a transmission destination. Outer side transmission source MAC address is a MAC address of a transmission source. To Ether type, C-tag is designated. Outer side VLAN tag information is tag information of a VLAN.

Meanwhile, as depicted in FIG. 4, the packet format between the domains 1a is the format of the original Ethernet frame.

Referring back to FIG. 3, the domain boundary information storage unit 22 stores information indicative of whether or not a domain boundary is set to one of ports the TRILL-SW 2 includes. The forwarding table 23 is a table that associates a destination of a packet and an output port with each other.

The decision unit 24 refers to the forwarding table 23 to specify an output port for a packet and specifies a transfer destination of the packet from the output port. Then, the decision unit 24 uses the domain boundary information storage unit 22 and the information of the transfer destination to decide whether or not a packet is received from an adjacent terminal 3 or a different domain 1a and whether or not the packet is to be transmitted from the terminal 3 coupled to the TRILL-SW 2 or a different domain 1a.

Then, in the case where a packet is received from an adjacent terminal 3 or a different domain 1a, the decision unit 24 passes the packet to the header addition unit 25. On the other hand, in the case where a packet is to be transmitted to a coupled terminal 3 or a different domain 1a, the decision unit 24 passes the packet to the header deletion unit 26. Further, in the case where a packet is received from a TRILL-SW 2 in the same domain 1a or a packet is to be transmitted to a TRILL-SW 2 in the same domain 1a, the decision unit 24 passes the packet to the TRILL transfer unit 27.

It is to be noted that the decision unit 24 may decide whether or not a packet is received from a coupled terminal 3 or a different domain 1a based on whether or not a received packet has a TRILL header.

In the case where the TRILL-SW 2 receives a packet from a coupled terminal 3 or a different domain 1a, the header addition unit 25 generates and adds a TRILL header and an outer side Ethernet header to the packet. At this time, the header addition unit 25 sets the hop number to 0.

In the case where the TRILL-SW 2 is to transmit a packet to a coupled terminal 3 or a different domain 1a, the header deletion unit 26 deletes the TRILL header and the outer side Ethernet header from the packet.

If the TRILL transfer unit 27 receives a packet from the decision unit 24 or the header addition unit 25, the TRILL transfer unit 27 transfers the packet by TRILL.

If the Ether transfer unit 28 receives a packet from the header deletion unit 26, the Ether transfer unit 28 transfers the packet by the Ethernet.

The routing calculation processing unit 29 calculates a route corresponding to the destination of a packet and stores an output port for the packet in an associated relationship with the destination into the forwarding table 23.

Figure 5:
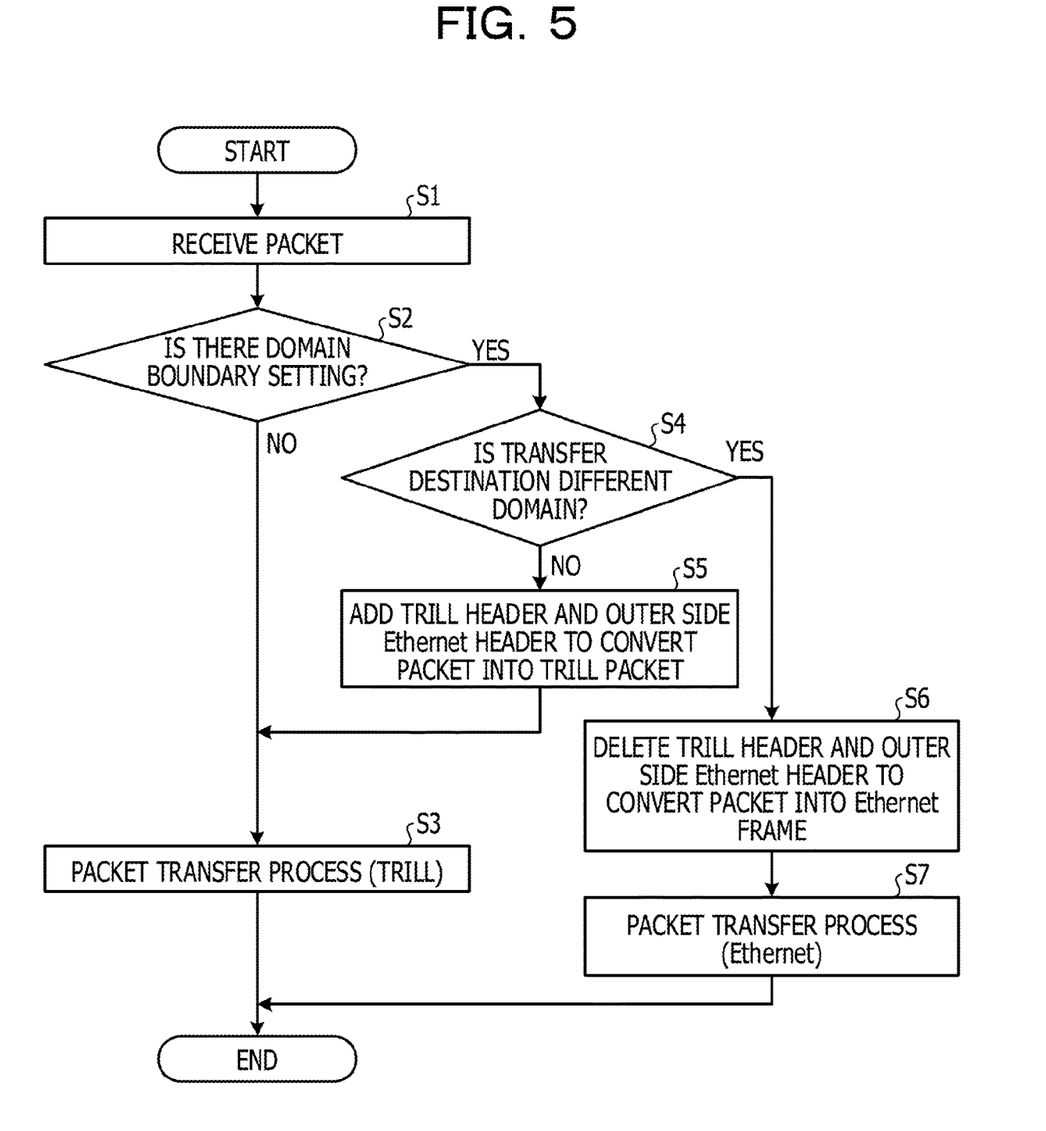
FIG. 5 is a flow chart depicting a flow of a packet transfer process.

Now, a flow of a packet transfer process is described. FIG. 5 is a flow chart illustrating a flow of a packet transfer process. As depicted in FIG. 5, if the TRILL-SW 2 receives a packet (step S1), the TRILL-SW 2 refers to the domain boundary information storage unit 22 to decide whether or not there is a domain boundary setting (step S2).

Then, if there is no domain boundary setting, the TRILL-SW 2 performs a packet transfer process using a TRILL line (step S3). On the other hand, if there is a domain boundary setting, the TRILL-SW 2 decides whether or not the transfer destination is a different domain 1a (step S4). Then, if the transfer destination is not a different domain 1a, the TRILL-SW 2 adds a TRILL header and an outer side Ethernet header to the packet to convert the packet into a TRILL packet (step S5). Then, the TRILL-SW 2 performs a packet transfer process by the TRILL (step S3).

On the other hand, if the transfer destination is a different domain 1a, the TRILL-SW 2 deletes a TRILL header and an outer side Ethernet header to convert the packet into an Ethernet frame (step S6). Then, the TRILL-SW 2 performs a packet transfer process by the Ethernet (step S7).

In this manner, the TRILL-SW 2 may transfer a packet through more than 64 TRILL-SWs 2 by performing a process for adding or a process for deleting a TRILL header and an outer side Ethernet header on a domain boundary.

Figure 6:
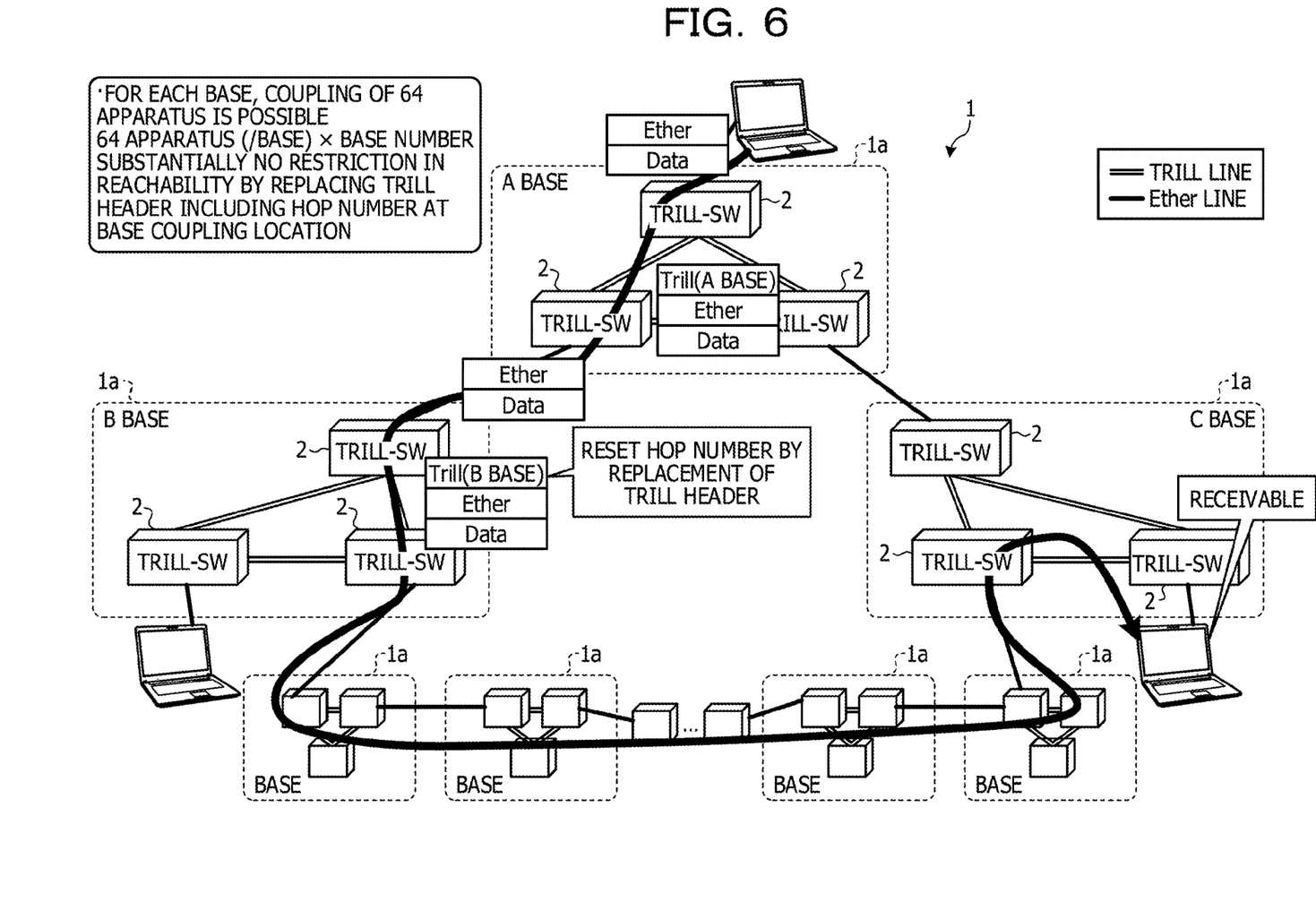
FIG. 6 is a view illustrating an advantageous effect that packet reach restriction disappears.

Now, advantageous effects of domain division are described with reference to FIGS. 6 to 9. FIG. 6 is a view illustrating an advantageous effect that packet reach restriction disappears. In the TRILL network 1, 64 TRILL-SWs 2 may be coupled for each base. Further, since a TRILL header including a hop number is replaced at a base coupling location, by increasing the number of bases, the TRILL network 1 may eliminate the packet reach restriction. Accordingly, as depicted in FIG. 6, it becomes possible for a packet to reach a terminal a packet fails to reach in FIG. 11.

Figure 7:
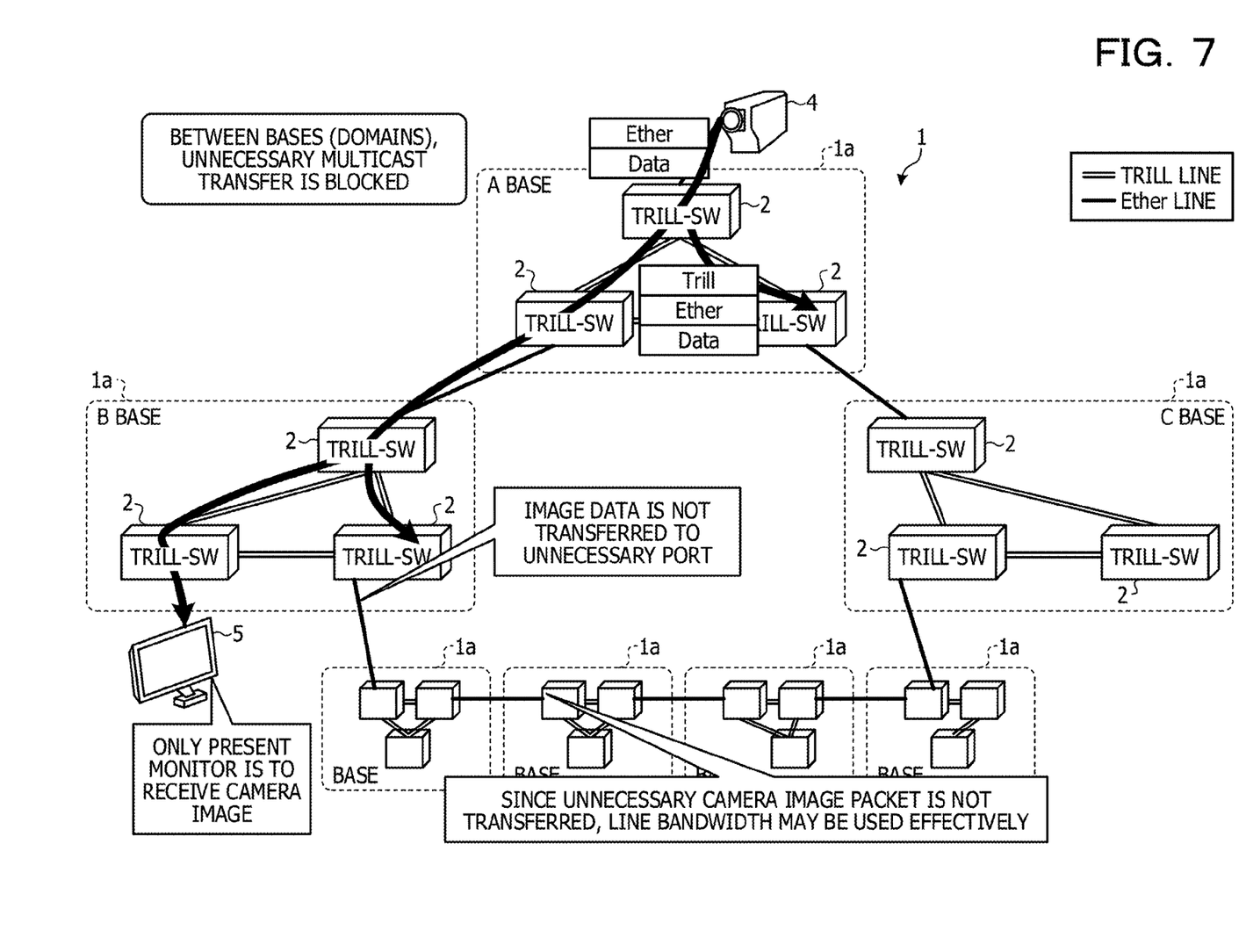
FIG. 7 is a view illustrating an advantageous effect that unnecessary multicast transfer disappears.

FIG. 7 is a view illustrating an advantageous effect that unnecessary multicast transfer disappears. FIG. 7 depicts a case in which a camera image picked up by a camera 4 is transferred to a monitor 5. As depicted in FIG. 7, between bases (domains 1a), communication by an Ether line is performed. Therefore, the TRILL-SW 2 may be controlled such that unnecessary multicast transfer is not performed using internet group management protocol (IGMP) snooping. Since an unnecessary camera image packet is not transferred, the TRILL network 1 may use the line bandwidth effectively.

Figure 8:
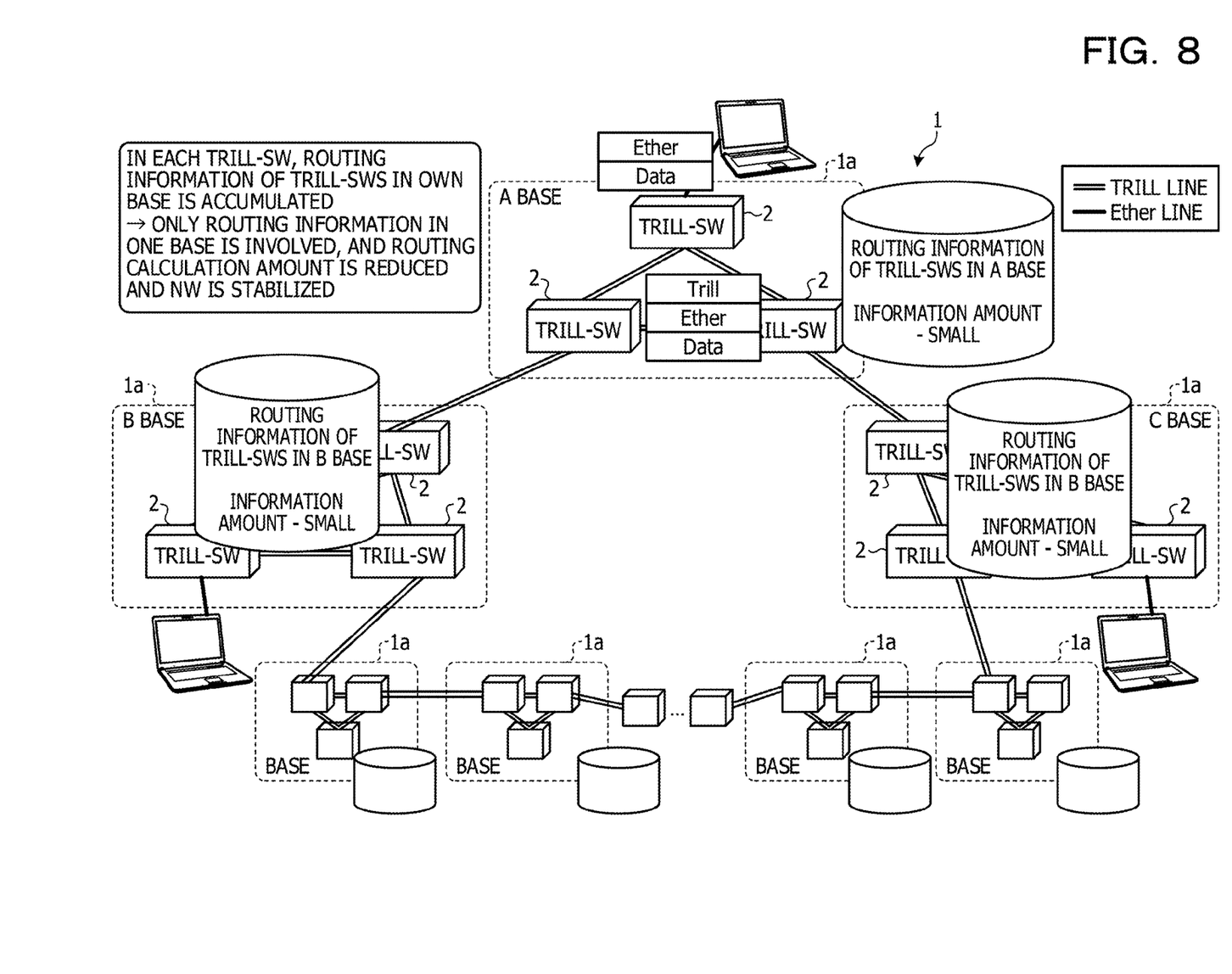
FIG. 8 is a view illustrating an advantageous effect that enlargement of routing information is suppressed.

FIG. 8 is a view illustrating an advantageous effect that enlargement of routing information is suppressed. As depicted in FIG. 8, each TRILL-SW 2 accumulates only routing information of the TRILL-SWs 2 in the own base (own domain 1a). The TRILL-SWs 2 included in the A base accumulate only routing information of the TRILL-SWs 2 in the A base, and the TRILL-SWs 2 in the B base accumulate only routing information of the TRILL-SWs 2 in the B base. The TRILL-SWs 2 included in the C base accumulate only routing information of the TRILL-SWs 2 in the C base.

Accordingly, in the TRILL network 1, the amount of routing information is small and also the routing calculation amount is small in comparison with those in an alternative case in which domain division is not involved. Therefore, the TRILL network 1 may be suppressed from being destabilized by increase of the routing calculation amount.

Figure 9:
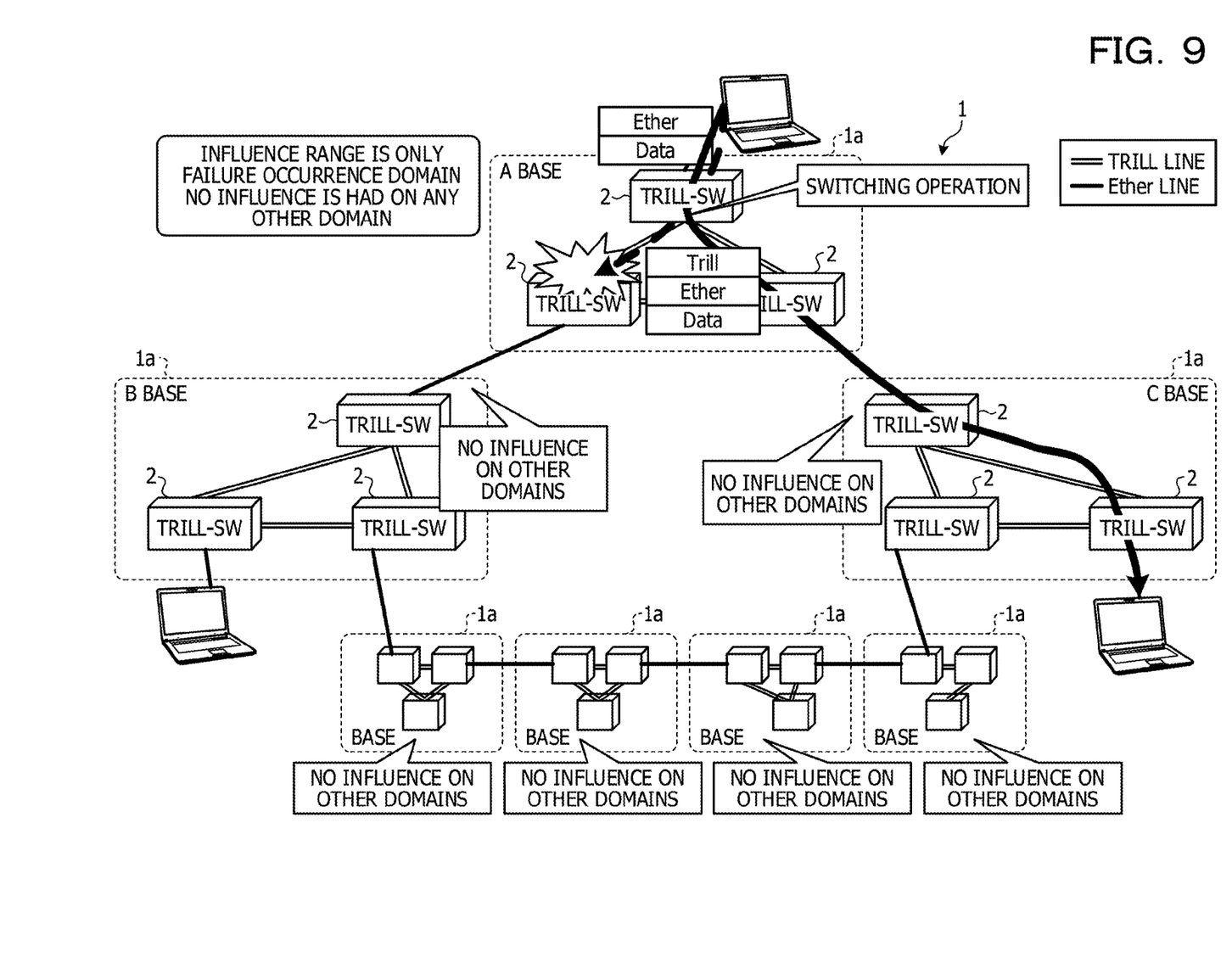
FIG. 9 is a view illustrating an advantageous effect that the influence when a failure occurs is localized.

FIG. 9 is a view illustrating an advantageous effect that the influence when a failure occurs is localized. FIG. 9 depicts a case in which a failure occurs in the A base. As depicted in FIG. 9, in the A base in which a failure occurs, a switching operation and so forth of the TRILL-SWs 2 may be required. On the other hand, the other domains 1a in the B base, C base and so forth are not influenced by the failure occurring in the A base. Accordingly, the TRILL network 1 may localize the influence when a failure occurs.

Figure 10:
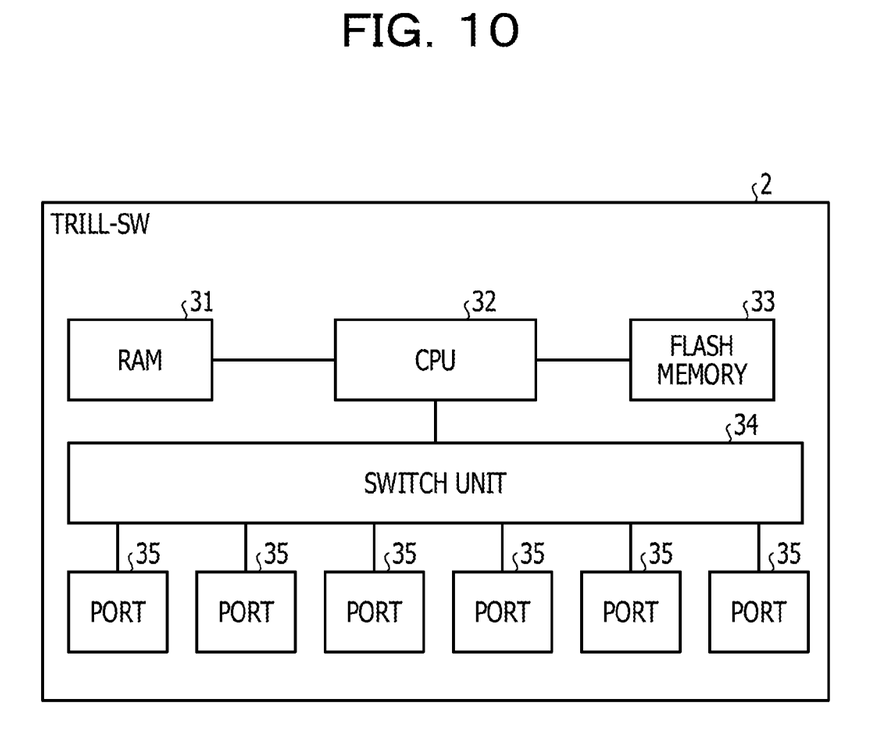
FIG. 10 is a block diagram depicting a hardware configuration of a TRILL-SW.

Now, a hardware configuration of the TRILL-SW 2 is described. FIG. 10 is a view depicting a hardware configuration of the TRILL-SW 2. As depicted in FIG. 10, the TRILL-SW 2 includes a random access memory (RAM) 31, a central processing unit (CPU) 32, a flash memory 33, a switch unit 34 and six ports 35. It is to be noted that the TRILL-SW 2 may otherwise include a number of ports 35 other than six.

The RAM 31 is a volatile memory that stores a program read out from the flash memory 33. Further, the RAM 31 stores data for execution of the program, interim results of program execution and so forth.

The CPU 32 is a central processing unit that reads out a program from the RAM 31 and executes the program. The flash memory 33 is a nonvolatile memory that stores a program. The switch unit 34 controls the coupling between the CPU 32 and the ports 35. The ports 35 perform reception or transmission of a packet.

As described above, in the embodiment, the TRILL network 1 is divided into a plurality of domains 1a. A TRILL-SW 2 transfers, in a domain 1a, a packet by TRILL, but transfers, between domains 1a, a packet by the Ethernet. Then, if the reception unit 21 receives a packet, the decision unit 24 decides whether or not the packet is received from a different domain 1a. Then, in the case where the decision unit 24 decides that the packet is received from a different domain 1a, the header addition unit 25 adds a TRILL header and an outer side Ethernet header. At this time, the header addition unit 25 sets the hop number to 0. Accordingly, the TRILL network 1 may eliminate the packet reach restriction.

Further, in the embodiment, the decision unit 24 decides whether or not a packet is received from a different domain 1*a* based on the domain boundary information storage unit 22 and the transfer destination of the packet. Alternatively, the decision unit 24 decides whether or not a packet is received from a different domain 1*a* based on whether or not a TRILL header is included in the packet. Accordingly, the decision unit 24 may make a decision correctly.

Further, in the embodiment, the decision unit 24 decides whether or not a packet is to be transferred to a different domain 1*a* based on the domain boundary information storage unit 22 and the transfer destination of the packet. Then, if the decision unit 24 decides that the packet is to be transferred to a different domain 1*a*, the header deletion unit 26 deletes the TRILL header and the outer side Ethernet header from the packet. Accordingly, the TRILL-SW 2 may transmit the packet by the Ethernet between the domains 1*a*.

It is to be noted that, while the description of the embodiment is directed to a TRILL network, the present technology is not restricted to this and may be applied similarly also to other networks such as a network that has a restriction in hop number, and a network that has a multicast or broadcast function.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method executed in a network including a plurality of domains coupled to each other, each of the plurality of domains including a plurality of routing bridges coupled to each other, the method comprising:
    receiving, by a first routing bridge of the plurality of routing bridges included in a first domain of the plurality of domains, a packet from a second domain of the plurality of domains;
    adding, to the packet by the first routing bridge, a header region in which a hop number of the packet is to be registered;
    transmitting the packet with the header region from the first routing bridge to a second routing bridges of the plurality of routing bridges included in the first domain;
    increasing the hop number registered in the header region in response to the transmitting of the packet from the first routing bridge to the second routing bridge; and
    when the packet is transmitted from the first domain to a third domain of the plurality of domains, resetting the hop number registered in the header region,
    wherein each of the plurality of domains is a first network based on transparent interconnection of lots of links (TRILL).

2. The method according to claim 1, wherein
a second network that couples the plurality of domains to each other is a protocol different from the TRILL.

3. The method according to claim 1, further comprising:
when the first routing bridge receives the packet from the second domain, the first routing bridge determining, by the first routing bridge, that the packet is received from the outside of the first domain based on whether the first routing bridge is positioned on a boundary of the first domain and a transfer destination of the packet.

4. The method according to claim 1, further comprising:
deleting the header region when the packet is transmitted from the first domain to the third domain.

5. The method according to claim 4, further comprising:
when the first routing bridge receives the packet from the second domain, determining, by the first routing bridge, that the packet is received from the outside of the first domain based on whether the header region is included in the packet.

6. A routing bridge included in a domain, the domain including a plurality of routing bridges, the routing bridge comprising:
    a memory; and
    a processor coupled to the memory and configured to:
    receive a packet from another domain;
    add, to the packet, a header region in which a hop number of the packet is to be registered;
    transmit the packet with the header region to other routing bridge of the plurality of routing bridges included in the domain;
    increase the hop number registered in the header region in response to the transmitting of the packet from the routing bridge to the another routing bridge; and
    when the packet is transmitted from the routing bridge to further another domain, reset the hop number registered in the header region,
    wherein each of the domain, the another domain and the further another domain is a first network based on transparent interconnection of lots of links(TRILL).

7. The routing bridge according to claim 6, wherein
a second network that couples the domain, the another domain and the further another domain to each other is a protocol different from the TRILL.

8. The routing bridge according to claim 6, wherein the processor is configured to:
    when the routing bridge receives the packet from the another domain, determine that the packet is received from the outside of the domain based on whether the routing bridge is positioned on a boundary of the domain and a transfer destination of the packet.

9. The routing bridge according to claim 6, wherein the processor is configured to:
    delete the header region when the packet is transmitted from the domain to the further another domain.

10. The routing bridge according to claim 9, wherein the processor is configured to:
    when the routing bridge receives the packet from the another domain, determine that the packet is received from the outside of the domain based on whether the header region is included in the packet.

11. A non-transitory computer-readable storage medium storing a program that causes a processor to execute a process, the processor being included in a routing bridge included in a domain, the domain including a plurality of routing bridges, the process comprising:
    receiving a packet from another domain;
    adding, to the packet, a header region in which a hop number of the packet is to be registered;
    transmitting the packet with the header region to other routing bridge of the plurality of routing bridges included in the domain;

increasing the hop number registered in the header region in response to the transmitting of the packet from the routing bridge to the another routing bridge; and when the packet is transmitted from the routing bridge to further another domain, resetting the hop number registered in the header region, wherein each of the domain, the another domain and the further another domain is a first network based on transparent interconnection of lots of links(TRILL).

12. The non-transitory computer-readable storage medium according to claim 11, wherein a second network that couples the domain, the another domain and the further another domain to each other is a protocol different from the TRILL.

13. The non-transitory computer-readable storage medium according to claim 11, the process further comprising:

when the routing bridge receives the packet from the another domain, determining that the packet is received from the outside of the domain based on whether the routing bridge is positioned on a boundary of the domain and a transfer destination of the packet.

14. The non-transitory computer-readable storage medium according to claim 11, the process further comprising:

deleting the header region when the packet is transmitted from the domain to the further another domain.

15. The non-transitory computer-readable storage medium according to claim 14, the process further comprising:

when the routing bridge receives the packet from the another domain, determining that the packet is received from the outside of the domain based on whether the header region is included in the packet.

* * * * *